United States Patent
Durand et al.

(10) Patent No.: US 7,625,968 B2
(45) Date of Patent: Dec. 1, 2009

(54) INORGANIC FILLERS FOR IMPROVING THE MATTNESS OF THE THERMOPLASTIC POLYMERS

(75) Inventors: Roland Durand, Lyons (FR); Arnaud Koscher, Brussels (BE); Sergio Refinetti, Sao Paulo (BR)

(73) Assignee: Rhodia Performance Fibres, Saint Laurent Blangy Cedex (FR)

( * ) Notice: Subject to any disclaimer, the term of this patent is extended or adjusted under 35 U.S.C. 154(b) by 194 days.

(21) Appl. No.: 10/562,057

(22) PCT Filed: Jun. 30, 2004

(86) PCT No.: PCT/FR2004/001680

§ 371 (c)(1),
(2), (4) Date: Jul. 17, 2006

(87) PCT Pub. No.: WO2005/012409

PCT Pub. Date: Feb. 10, 2005

(65) Prior Publication Data

US 2006/0258789 A1    Nov. 16, 2006

(30) Foreign Application Priority Data

Jul. 3, 2003  (FR) .................................. 03 08117

(51) Int. Cl.
*C08K 3/22* (2006.01)
*C08K 3/30* (2006.01)
*C08K 9/04* (2006.01)
*C08K 9/06* (2006.01)

(52) U.S. Cl. ...................... 524/418; 524/423; 524/425; 524/430; 524/432; 524/447

(58) Field of Classification Search ................. 524/418, 524/423, 425, 430, 432, 445, 447
See application file for complete search history.

(56) References Cited

U.S. PATENT DOCUMENTS

| | | | |
|---|---|---|---|
| 6,071,612 A | 6/2000 | Roderiguez et al. | |
| 2003/0035944 A1 | 2/2003 | Blackwell | |
| 2004/0087734 A1* | 5/2004 | Bianchi et al. | 525/425 |

FOREIGN PATENT DOCUMENTS

| | | | |
|---|---|---|---|
| DE | 273843 A1 | 11/1989 | |
| JP | 50-123097 | 9/1975 | |
| WO | WO 02/02696 A1 | 1/2002 | |
| WO | WO 03/091323 A1 | 11/2003 | |

OTHER PUBLICATIONS

International Search Report Corresponding to PCT/FR 2004/001680 Issued on Dec. 9, 2004, 6 Pages.

* cited by examiner

*Primary Examiner*—Kriellion A Sanders
(74) *Attorney, Agent, or Firm*—Buchanan, Ingersoll & Rooney P.C.

(57) ABSTRACT

Combinations of inorganic fillers improve the mattness of thermoplastic polymer compositions, in particular of fibers produced from thermoplastic polymer compositions, and in particular the mattness of fibers of thermoplastic polymer compositions suited for flocking.

12 Claims, No Drawings

INORGANIC FILLERS FOR IMPROVING THE MATTNESS OF THE THERMOPLASTIC POLYMERS

CROSS-REFERENCE TO PRIORITY/PCT APPLICATIONS

This application claims priority under 35 U.S.C. § 119 of FR 03/08117, filed Jul. 3, 2003, and is the National Phase of PCT/FR 2004/001680, filed Jun. 30, 2004 and designating the United States, published on Feb. 10, 2005 as WO 2005/012409 A1, each hereby expressly incorporated by reference and each assigned to the assignee hereof.

The present invention relates to the use of a combination of inorganic fillers which are intended to improve the mattness of thermoplastic polymer compositions. The invention also relates to the thermoplastic polymer compositions comprising this combination of inorganic fillers as mattness agent and to the yarns, fibres, filaments and articles obtained from these compositions.

Thermoplastic polymers have been widely used for many years, in particular in the textile field in the form of yarns, fibres and filaments, as substitutes for natural products because of the reduced availability and/or higher cost of the latter.

However, the substitution of natural products by thermoplastic polymers leads to quality differences in the finished products, both as regards mechanical strength and chemical resistance and as regards the feel, external appearance, and the like.

While it is already well known that much progress has been achieved as regards the aspects of mechanical strength and chemical resistance, the final consumer often raises the objection that thermoplastic polymers are excessively glossy, in particular when they are in the form of fibres, in comparison with their natural homologues.

For this reason, attempts have been made for many years to mattify thermoplastic polymers as much as possible, that is to say to give them a more matt or alternatively less glossy appearance.

The prior art provides numerous processes which make it possible to improve the mattness of thermoplastic polymers and it is known in particular that the incorporation of inorganic fillers, such as titanium dioxide ($TiO_2$) or zinc sulphide (ZnS), in synthetic fibres, for example polyamide or polyester, can result in mattness indices which are relatively satisfactory, indeed even acceptable, for the majority of uses.

This is because, among the additives capable of conferring high mattness on a thermoplastic polymer composition, titanium dioxide appears today to be that which offers the best mattness index, for equal amounts of additives. To further increase the mattness of thermoplastic polymers and in particular of polyamides, it might be envisaged to increase the level of $TiO_2$ in the polymer composition.

However, it is noticed that an increase in the amount of titanium dioxide only results in a very slight increase in the mattness and in particular that, with relatively high levels of titanium dioxide, the physical characteristics of the thermoplastic polymer compositions and their processability tend to greatly deteriorate.

Apart from the detrimental change in their mechanical properties and a poorer processability, an increase in the amount of fillers in polymer compositions also exhibits the disadvantage of substantially increasing the cost of the finished product.

A need consequently remains for thermoplastic polymer compositions which exhibit a greater mattness than that known in the prior art and for which the percentage by weight of mattness filler is compatible with the applications desired and with the processability and the physical characteristics.

The literature provides numerous examples of thermoplastic polymers comprising various inorganic fillers which make it possible to confer properties of flame retardancy, fluorescence, opaqueness, whiting, mattness, porosity, and the like, on the said polymers.

Thus, U.S. Pat. No. 6,071,612 discloses polyester yarns, fibres or filaments comprising zinc sulphide (ZnS, in proportions of between 0.1% and 3% by weight) or alternatively a $TiO_2$+ZnS combination. Two examples show that a $TiO_2$+ZnS combination representing a total of 2.17% and 2.4% by weight with respect to the total weight of polymer makes it possible to increase the whiteness and to enhance the feel of polyester compositions. This is because it is known that polyester-based compositions have a tendency to turn yellow and the aim is specifically to increase the whiteness of these compositions.

Thus it is demonstrated that zinc sulphide significantly increases the whiteness of polyester compositions, a whiteness expressed in terms of luminescence. However, this notion of whiteness has no connection with the matt appearance which is being sought for in the present patent application. A person skilled in the art knows how to assess and differentiate the relatively matt appearance of two similar "whites".

Patent Application WO-A1-99/67451 teaches that the addition of zinc sulphide, instead of titanium oxide, to a thermoplastic polymer makes it possible to significantly reduce the abrasion of the knife blades used to cut up the fibres intended for flocking. The amount of zinc sulphide added to the polymer is 1.5% by weight in the examples. This amount is presented as sufficient to produce a mattness similar to the same polymer comprising 1.5% of $TiO_2$ as filler.

Patent Application JP-50123097 discloses the use, as mattness agent, of a titanium dioxide/silica complex prepared by simultaneous oxidation of the corresponding chlorides. It is not a question here of a combination of inorganic fillers but rather of forming a novel type of inorganic filler which can be used as mattness agent.

Patent DD 273 843 discloses, for its part, a process for rendering polyamide or polyester polymer fibres matt, in which a portion of the titanium dioxide is replaced by barium sulphate for reasons of a purely economic nature. The mattifying effect is measured using the "Taube whiteness" index and is assessed as being comparable with that of titanium dioxide alone, for total amounts of inorganic fillers of 1.0% and 1.3% by weight.

Thus, a first object of the present invention consists in providing inorganic fillers which make it possible to obtain an improved mattness of thermoplastic polymers.

Another object of the present invention consists in providing inorganic fillers which make it possible to obtain an improved mattness of thermoplastic polymers with respect to the mattness obtained with an equal amount of $TiO_2$ alone.

Yet other objects will become apparent in the detailed description of the invention which follows.

The inventors have discovered, surprisingly, that the objects set out above can be achieved in all or in part by using, as additive in thermoplastic polymer compositions, a combination of inorganic fillers in order to improve the degree of mattness of the said polymer compositions.

More specifically, the invention relates first of all to the use of a combination of inorganic fillers as additive in thermoplastic polymer compositions for improving the mattness of the said compositions, characterized in that the combination comprises at least two inorganic fillers chosen from zinc sulphide (ZnS), titanium dioxide ($TiO_2$), barium sulphate ($BaSO_4$), silica ($SiO_2$), alumina, kaolin, calcium carbonate, calcium sulphate and mattifying clays.

In the present description, the term "mattness" should be understood as the contrary or opposing term to "glossiness". The term "mattifying clays" is understood to mean the clays known to a person skilled in the art and used as mattness agent in thermoplastic polymer compositions.

This is because the inventors have discovered that the use of a combination of at least two inorganic fillers among those listed above as additive in a thermoplastic polymer composition makes it possible to obtain a mattness comparable with, indeed even better than, the mattness which would have been obtained by addition of an equal amount of a single mattness agent, in particular of titanium dioxide alone, to the same thermoplastic polymer composition.

The inorganic fillers used in combination as mattness agent are generally provided in the form of small particles, preferably about a micron or less than a micron in size. This is because the size of the particles has to remain compatible with the constraints in processing the thermoplastic polymer compositions and in particular for the preparation of yarns, fibres or filaments.

In addition, these particles can advantageously be coated, for example in order to protect them against various chemical or physical attacks or alternatively in order to render them inert with respect to the various components in which they are incorporated. The coating agent will be chosen from the agents known to a person skilled in the art and must in addition not interfere with the intrinsic mattness properties of the various inorganic fillers used.

It can also be advantageous to use inorganic fillers in the form of coated particles on a support, which will preferably be inorganic, such as, for example, silica, alumina, and the like.

According to a preferred embodiment, the present invention relates to the use of a combination of inorganic fillers as additive in thermoplastic polymer compositions for improving the mattness of the said compositions, characterized in that the combination comprises at least two inorganic fillers chosen from zinc sulphide (ZnS), titanium dioxide ($TiO_2$), barium sulphate ($BaSO_4$) and silica ($SiO_2$)

Preference is given, for the use described below, to the combinations comprising two inorganic fillers, or three inorganic fillers, indeed even four inorganic fillers, and in particular to the combinations comprising two inorganic fillers (binary combinations) chosen from those comprising zinc sulphide and titanium dioxide, zinc sulphide and barium sulphate or zinc sulphide and silica and those comprising titanium dioxide and silica.

The combinations which are very particularly preferred for the use according to the present invention are those which comprise zinc sulphide and titanium dioxide and those which comprise titanium dioxide and silica.

According to the present invention, the combination of inorganic fillers described above is used as mattness agent and, in this respect, is employed as additive in polymer compositions, in particular in thermoplastic polymer compositions, for example such as those used in the textile field for the preparation of textile yarns, fibres, filaments and articles but also in numerous other fields where the mattness of polymer compositions processed by rolling, pultrusion, extrusion, extrusion-blow moulding, and the like, is desired.

The combination of inorganic fillers used as mattness agent can advantageously be used as additive, for example, in sizing formulations for yarns, fibres and filaments, and the like.

According to a specific embodiment of the invention, the proportion by weight of the combination of inorganic fillers with respect to the total weight of the polymer composition is greater than 1.5%, preferably greater than or equal to 2%, more preferably greater than or equal to 2.5%, by weight.

For reasons of chemical, physical and mechanical properties, the proportion by weight of inorganic fillers used as matting agent with respect to the total weight of the polymer composition is less than 10%, preferably less than 7%, advantageously less than 4%, by weight.

According to the present invention, it is thus possible to use a combination of inorganic fillers as described above, each of the fillers constituting the said combination being present in any proportion. By way of examples, and without implied limitation, the inorganic fillers of the binary combinations will be employed in the use of the invention in proportions by weight varying from 1:99 to 99:1, preferably from 20:80 to 80:20, in particular from 40:60 to 60:40, more specifically in proportions by weight of the order of 50:50.

According to a preferred embodiment of the invention, the latter relates to the use of a combination of inorganic fillers as mattness agent for thermoplastic polymer compositions, characterized in that the combination comprises titanium dioxide and zinc sulphide in any proportions.

In addition, it has been discovered, surprisingly, that the use of the combination of inorganic fillers as defined above produces, in the thermoplastic polymer compositions to which it is added, a degree of mattness comparable with or greater than that obtained by using a single inorganic filler chosen from titanium dioxide, zinc sulphide, barium sulphate or silica.

In particular, an entirely advantageous synergistic effect has been able to be observed between titanium dioxide and zinc sulphide, in particular when these fillers are used in a ratio of or in the vicinity of 1. The degree of mattness observed with an amount of the 1:1 combination of $TiO_2$/ZnS is greater than that observed with an equal amount of $TiO_2$ alone or an equal amount of ZnS alone.

Other comparable synergistic effects have also been able to be observed with other combinations of inorganic fillers, such as, for example, the combinations ZnS/$BaSO_4$, ZnS/$BaSO_4$/$TiO_2$, ZnS/$SiO_2$, ZnS/$SiO_2$/$TiO_2$ and $TiO_2$/$SiO_2$. Some of the thermoplastic polymer compositions comprising these combinations as additives have a degree of mattness which had never yet been observed until then with the techniques disclosed in the prior art, at an equal level of filler.

The thermoplastic polymer compositions which can be used in the context of the present invention comprise a thermoplastic polymer matrix composed of one or more thermoplastic polymers. However, it should be understood that any polymer matrix known to a person skilled in the art can be employed in the context of the present invention.

Mention may be made, as examples of thermoplastic polymers which may be suitable as polymer matrix in the context of the present invention, of: polylactones, such as poly(pivalolactone), poly(caprolactone) and polymers of the same family; polyurethanes obtained by reaction between diisocyanates, such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and compounds of the same family, and diols with long linear chains, such as poly (tetramethylene adipate), poly(ethylene adipate), poly(1,4-butylene adipate), poly(ethylene succinate), poly(2,3-butylene succinate), polyether diols and compounds of the same family; polycarbonates, such as poly[methanebis(4-phenyl) carbonate], poly[1,1-etherbis(4-phenyl)carbonate], poly [diphenylmethanebis(4-phenyl)carbonate], poly-[1,1-cyclohexanebis(4-phenyl)carbonate] and polymers of the same family; polysulphones; polyethers; polyketones; polyamides, such as poly(4-aminobutyric acid), poly(hexamethylene adipamide), poly(6-aminohexanoic acid), poly(m-xylylene adipamide), poly(p-xylylene sebacamide), poly(2,2,2-trimethylhexamethylene terephthalamide), poly(meta-phenylene isophthalamide), poly (p-phenylene terephthalamide) and polymers of the same family; polyesters, such as poly(ethylene azelate), poly(ethylene 1,5-naphthalate), poly(1,4-cyclohexanedimethylene terephthalate), poly(ethylene oxybenzoate), poly(para-hydroxybenzoate), poly(1,4-cyclohexylidenedimethylene terephthalate), polyethylene terephthalate, polybutylene terephthalate and polymers of the same family; poly(arylene oxide)s, such as poly(2,6-dimethyl-1,4-phenylene oxide), poly(2,6-diphenyl-1,4-phenylene oxide) and polymers of the same family; poly(arylene sulphide)s, such as poly(phenylene sulphide) and polymers of the same family; polyetherimides; vinyl polymers and their copolymers, such as poly(vinyl acetate), poly(vinyl alcohol), poly(vinyl chloride), poly(vinylbutyral), poly(vinylidene chloride); ethylene-vinyl acetate copolymers and polymers of the same family; acrylic polymers, polyacrylates and their copolymers, such as poly(ethyl acrylate), poly(n-butyl acrylate), poly(methyl methacrylate), poly(ethyl methacrylate), poly(n-butyl methacrylate), poly(n-propyl methacrylate), poly(acrylamide), poly(acrylonitrile), poly(acrylic acid); ethylene-acrylic acid copolymers, ethylene-vinyl alcohol copolymers, acrylonitrile copolymers, methyl methacrylate-styrene copolymers, ethylene-ethyl acrylate copolymers, methacrylate-butadiene-styrene copolymers, ABS and polymers of the same family; polyolefins, such as low density poly(ethylene), poly(propylene), low density chlorinated poly(ethylene), poly(4-methyl-1-pentene), poly(ethylene), poly(styrene) and polymers of the same family; ionomers; poly(epichlorohydrin)s; poly(urethane)s, such as polymerization products of diols, such as glycerol, trimethylolpropane, 1,2,6-hexanetriol, sorbitol, pentaerythritol, polyether polyols, polyester polyols and compounds of the same family, with polyisocyanates, such as 2,4-tolylene diisocyanate, 2,6-tolylene diisocyanate, 4,4'-diphenylmethane diisocyanate, 1,6-hexamethylene diisocyanate, 4,4'-dicyclohexylmethane diisocyanate and compounds of the same family; polysulphones, such as the products of reaction between a sodium salt of 2,2-bis(4-hydroxyphenyl)propane and 4,4'-dichlorodiphenyl sulphone; furan resins, such as poly(furan); cellulose ester plastics, such as cellulose acetate, cellulose acetate butyrate, cellulose propionate and polymers of the same family; silicones, such as poly(dimethylsiloxane), poly (dimethylsiloxane-co-phenylmethylsiloxane) and polymers of the same family; and blends of at least two of the above polymers.

According to a specific alternative form of the invention, the thermoplastic matrix is a polymer comprising star-shaped or H-shaped macromolecular chains and, if appropriate, linear macromolecular chains. The polymers comprising such star-shaped or H-shaped macromolecular chains are disclosed, for example, in the documents FR 2 743 077, FR 2 779 730, U.S. Pat. No. 5,959,069, EP 0 632 703, EP 0 682 057 and EP 0 832 149.

According to another specific alternative form of the invention, the thermoplastic matrix of the invention is a polymer of random tree type, preferably a copolyamide exhibiting a random tree structure. These copolyamides with a random tree structure and their process of preparation are disclosed in particular in the document WO 99/03909.

The thermoplastic matrix as defined in the context of the present invention can also be a composition comprising a linear thermoplastic polymer and a star-shaped, H-shaped and/or random tree thermoplastic polymer as are described above.

Within the meaning of the present invention, the thermoplastic polymer compositions can also comprise a hyperbranched copolyamide of the type of those disclosed in the document WO 00/68298. Of course, the compositions mentioned in this description can also comprise any combination of star-shaped, H-shaped or random tree thermoplastic polymer or hyperbranched copolyamide described above.

Mention may be made, as other type of polymer matrix which can be employed in the context of the invention, of thermally stable polymers: these polymers are preferably infusible or exhibit a softening point of greater than 180° C., preferably of greater than or equal to 200° C., indeed even greater.

These thermally stable polymers can, for example, be chosen from aromatic polyamides, polyamideimides, such as polytrimellamideimides, or polyimides, such as the polyimides obtained according to the document EP 0 119 185, known commercially under the P84 trade name. The aromatic polyamides can be as disclosed in Patent EP 0 360 707. They can be obtained according to the process disclosed in Patent EP 0 360 707.

Preference is very particularly given, among the polymer matrices, to polyamide-based matrices and in particular semi-crystalline polyamides, such as polyamide 6, polyamide 6,6, polyamide 11, polyamide 12, polyamide 4, polyamides 4,6, 6,10, 6,12, 6,36 and 12,12, and semiaromatic polyamides obtained from terephthalic and/or isophthalic acid, such as the polyamide sold under the trade name Amodel; polyesters, such as PET, PBT or PTT; polyolefins, such as polypropylene or polyethylene; aromatic polyamides, polyamideimides or polyimides; the latices, such as acrylic and urethane latices; PVC, viscose, cellulose or cellulose acetate; or their copolymers and alloys.

The thermoplastic polymer compositions can additionally comprise any other additive which can be used, for example reinforcing fillers, flame-retardants, UV stabilizers, heat stabilizers, and other mattness agents, such as, for example, those defined in the present invention, and other agents known to a person skilled in the art.

Another subject-matter of the present invention relates to the process for the preparation of the thermoplastic polymer compositions comprising a combination of inorganic fillers as defined above as mattness agent. The various fillers can be added to the polymer composition according to any means known to a person skilled in the art. However, among these, preference is given to the addition of the fillers by feeding into the molten stream of the matrix or of the polymer composition or alternatively by means of a masterbatch.

According to another aspect, it is also possible to envisage combining, indeed even may be appropriate to combine, the latter two feeding methods, feeding into a molten stream and masterbatch.

According to an alternative form of the process for the addition of the inorganic fillers according to the invention, the latter can be added separately, according to one or more of the feeding methods set out above. Thus, for example, one filler can be fed into the molten stream while the other will be fed via a masterbatch.

The masterbatch will be prepared such that it comprises an amount of inorganic mattness fillers of between 10% and 60% by weight, preferably between 20% and 50% by weight, advantageously between 30% and 40% by weight.

The thermoplastic polymer compositions comprising a combination of inorganic fillers in a proportion of more than 0.5% by weight, preferably of more than 1% by weight, more preferably of more than 1.5% by weight, with respect to the total weight of the composition, as mattness agent, which compositions are as defined above, are novel and therefore also form another subject-matter of the present invention.

However, the compositions in which the matrix comprises a polyester to which is added a binary combination of inorganic fillers composed of $TiO_2$ and of ZnS are excluded from the present invention. Such compositions are disclosed in U.S. Pat. No. 6,071,612 discussed above in the present description.

Preference is given, among the above compositions, to those comprising the specific combinations of inorganic fillers chosen from $ZnS/TiO_2$, $ZnS/SiO_2$, $ZnS/SiO_2/TiO_2$ and $TiO_2/SiO_2$, with the exception of the polymer compositions with a polyester matrix comprising a binary combination of titanium dioxide and of zinc sulphide.

Preference is also given to the thermoplastic polymer compositions with a polyamide matrix comprising, as mattness agent, a combination of inorganic fillers chosen from $ZnS/TiO_2$, $ZnS/SiO_2$, $ZnS/SiO_2/TiO_2$ and $TiO_2/SiO_2$, the combinations based on zinc sulphide being very particularly preferred, in particular the binary combinations based on zinc sulphide and in particular the $ZnS/TiO_2$ combination.

It has thus been discovered that the thermoplastic polymer compositions comprising a combination as defined above of inorganic fillers exhibit an entirely advantageous degree of mattness.

In addition, due to the surprising synergistic effect observed, in particular with combinations of inorganic fillers chosen from titanium dioxide, zinc sulphide, barium sulphate and silica, the degree of mattness observed is comparable with or greater than the degrees of mattness observed for similar thermoplastic polymer compositions comprising an equal amount of mattness agent, this mattness agent comprising only a single one of the inorganic fillers listed above.

The present invention also relates to the articles and in particular the yarns, fibres and filaments obtained from the compositions described above, in which the combination of inorganic fillers according to the invention has been used. This is because these compositions can be formed into moulded articles, for example by injection moulding or by extrusion. They can also be formed into yarns, fibres and filaments by spinning.

In the case of the yarns, fibres and filaments, the latter can be obtained, for example, by melt spinning or by wet spinning the compositions comprising the combination of fillers according to the invention as additive. The compositions are then preferably prepared by introducing the inorganic fillers into the molten polymer in a blending device, for example upstream of a spinning device. They can also be prepared by introducing the inorganic fillers into a polymer solution, for example upstream of a device for wet spinning.

By spinning the compositions of the invention, it is possible to obtain, for example, continuous multifilament yarns, short or long fibres, monofilaments, spun yarns for fibres, laps, slivers, tows, and the like. The product obtained can also be bulk continuous filaments (BCF), used in particular for the manufacture of textile coverings, such as carpets, including fitted carpets.

All the conventional treatments in the textile field can be applied to the yarns, fibres and filaments obtained from the thermoplastic polymer compositions presented in the context of the invention, such as drawing, texturing, dyeing, and the like. In the field of textile yarns, fibres or filaments, the small size of the particles of the inorganic fillers used as mattness agents (of the order of a micrometer, indeed even less than a micrometer, for example of the order of 0.3 μm) is an advantage in spinning processes in particular.

The invention also relates to articles obtained from the yarns, fibres or filaments described above. Such articles can be obtained in particular from a single type of yarn, fibre or filament or, in contrast, from a mixture of yarns, fibres or filaments of different types.

The article comprises, at least in part, the yarns, fibres of filaments obtained from the thermoplastic polymer compositions presented in the context of the invention. The article can also comprise other types of yarns, fibres or filaments, for example yarns, fibres or filaments not comprising the combination of inorganic fillers according to the invention. For a given type of yarn, fibre or filament, yarns, fibres or filaments of different natures can be used in the article of the invention.

Mention may be made, as articles, for example, of woven, nonwoven or knitted articles. The present invention also relates to composite articles, that is to say articles comprising several components. These components can be, for example, short fibres, backings, articles, for example textile articles, obtained from yarns, fibres or filaments, such as nonwoven articles, and the like.

Mention may be made, as composite textile articles of, for example, flocked surfaces, the main components of which are generally short fibres, an adhesive, and a backing. Mention may also be made of tufted surfaces, used in particular in fitted carpets, coverings for furniture or walls, and the like, the main components of which are generally yarns, fibres, filaments or articles obtained from yarns, fibres or filaments, a backing and optionally an adhesive.

In a flocked surface, for example, the mattness agent, i.e. the combination of inorganic fillers according to the present invention, is present in the fibres of the flocked surface and can also be present in the adhesive used for the flocking and/or in the backing of the flocked surface.

The compositions, articles, textile articles, yarns, fibres and filaments, which are optionally composite, can be employed in the manufacture of any product for which great mattness is desired, in particular a mattness greater than that observed to date by the use of titanium dioxide, indeed even an even greater mattness not disclosed at the date of the present invention.

The thermoplastic polymer compositions according to the present invention have a very particularly advantageous use in the preparation of flocked surfaces having a very high mattness.

In addition to the high mattness observed, the use of combinations of inorganic fillers according to the invention exhibits numerous other advantages and in particular economic advantages which may be not insignificant, in particular when titanium dioxide, ordinarily used as mattness agent, can be replaced, in all or in part, by one or more other cheaper inorganic fillers.

A person skilled in the art thus has available, by virtue of the present invention, more economic means which make it possible to obtain an even greater mattness for thermoplastic polymer compositions.

Furthermore, it is well known that titanium dioxide, used alone in thermoplastic polymer compositions intended for the preparation of flocked surfaces, results in significant wear of the knives used to cut up the fibres.

By virtue of the present invention, it is henceforth possible, by using a combination of inorganic fillers as defined above, to greatly reduce the wear on the knives and thus the frequency of replacement of the said knives, this being achieved while obtaining a mattness at least equal to, indeed even greater than, that obtained by incorporation in the thermoplastic polymer composition of an equal amount of a single mattifying inorganic filler.

Other details and advantages of the invention will become more clearly apparent in the light of the examples below, given solely by way of indication.

EXAMPLES

Preparation of Samples of Polyamide 6,6 Yarns, Combinations of Inorganic Fillers Having Been Added to the Polyamide a) Preparation of the Samples Series of samples based on polyamide comprising ZnS/$TiO_2$ combinations, on the one hand, and $SiO_2$/$TiO_2$ combinations, on the other hand, are prepared.

The polyamide 6,6 (PA 6,6) employed is a polyamide 6,6 which does not comprise titanium dioxide and which has a relative viscosity (measured at a concentration of 10 g/l in 96% sulphuric acid) of 2.6.

The ZnS used (sold by Sachtleben) has a particle size centred around 0.35 µm.

The $TiO_2$ used is sold under the name of 1074® by Kronos.

The silica ($SiO_2$) used is sold under the name of Aerosil R812® by Degussa.

The incorporation of the mattness agent (combination as indicated above of the inorganic fillers) in the PA 6,6 is carried out:

- either by blending the mattness agent in the powder form with the milled polymer;
- or via a polyamide-based masterbatch (MB) comprising 30% by weight of mattness agent and then blending the PA 6,6 with the masterbatch, the PA 6,6 and MB each being in the form of granules.

In each case, the combination is introduced into an extrusion device which provides melt blending. The level of incorporation of the combined inorganic fillers is set at 1.5%, 2% and 3% in the case of the $SiO_2$/$TiO_2$ combination and at 2%, 2.5% and 3% in the case of the ZnS/$TiO_2$ combination.

b) Preparation for Spinning

The melt blend is subsequently spun with a spinneret head temperature of approximately 285° C., cooled with air (20° C., 65% relative humidity) and forwarded with a winding speed of 800 m/min, so as to obtain a continuous multifilament yarn. This continuous multifilament yarn is drawn in order to obtain an elongation at break of the order of 80%. The multifilament or yarn thus obtained is composed of 20 strands and the diameter of the strand is approximately 20 µm.

The spinneret used is a 20-hole spinneret with a round cross section.

The elementary count with respect to the finished product is 2.3 dtex.

Description of the Test for Visual Evaluation of the Mattness of Flocked Surfaces a) Preparation of a Flocked Surface Flocked surfaces are prepared using each of the samples obtained above (3 with ZnS/$TiO_2$ and 3 with $SiO_2$/$TiO_2$).

The continuous yarns are cut up in the form of fibres with a length of 1 mm. The fibres are subjected to an activation treatment based on tannin/aluminium sulphate.

The fibres are subsequently flocked on a black polyester/cotton fabric (A4 format backing) coated with the adhesive Tubvinyl 235SL®+4% by weight of Tubassist Fix 102W® (sold by CHT) over a thickness of 15/100th of a mm.

The flocked surface thus obtained is subsequently dyed in an ordinary bath with 3% by weight, with respect to the weight of the fibres, of Irgalan Black® RBLN (sold by Ciba).

b) Evaluation of the Mattness

The mattness is evaluated visually by a panel of a specific group of 7 people at least (controllers).

Each test is carried out by comparative evaluation of the flocked surfaces (3 at most) placed on a roll of black fabric, outside and in the sunlight.

The surfaces presented to the controllers are devoid of any distinctive mark capable of influencing the evaluation.

The results obtained are presented in the following Table I:

TABLE I

Evaluation of the mattness

Table Ia: $TiO_2$/$SiO_2$ combination

|  |  | Total fillers (%) | | |
| --- | --- | --- | --- | --- |
|  |  | 1.5 | 2 | 3 |
| $TiO_2$/$SiO_2$ | 0:100 | ⓿ | ⓿ | ❶ |
|  | 50:50 | ❶ | ❶ | ❷ |
|  | 100:0 | ❶ | ❶ | ❷ |

Table Ib: ZnS/$TiO_2$ combination

|  |  | Total fillers (%) | | |
| --- | --- | --- | --- | --- |
|  |  | 2 | 2.5 | 3 |
| ZnS/$TiO_2$ | 0:100 | ❶ | ❷ | ❸ |
|  | 25:75 | ❷ | ❹ | ❺ |
|  | 50:50 | ❷ | ❹ | ❺ |
|  | 75:25 | ❷ | ❹ | ❺ |
|  | 100:0 | ❶ | ❸ | ❹ |

The mattness is evaluated on a scale from ⓿ to ❺, indicating a degree of mattness ranging from low to very high, respectively.

On reading these results, it is indicated that, at a low level of total fillers (1.5%), the silica/titanium dioxide combination already produces a mattness comparable with that obtained with titanium dioxide alone.

This effect is confirmed when the level of total fillers increases.

In addition, it is also possible to observe a synergy between the two inorganic fillers, titanium dioxide and zinc sulphide, for example, since, from 2% of total fillers, the mattness obtained with this combination is greater in all cases than the mattness obtained, at an equal amount of fillers, with zinc sulphide alone but also with titanium dioxide alone.

The present invention thus clearly shows that it is possible to obtain, by virtue of combinations of mattness agents, degrees of mattness never yet achieved with an equal amount of a single mattness agent.

The invention claimed is:

1. A thermoplastic polymer composition comprising: (a) more than 2% by weight and less than 4% by weight with respect to the total weight of the polymer composition of a combination of inorganic fillers, said combination comprising at least two inorganic fillers selected from the group consisting of zinc sulfide, titanium dioxide, silica, and barium sulphate, and (b) a thermoplastic matrix selected from the group consisting of polyesters and polyamides, other than a polymer composition having a polyester matrix and comprising a binary combination of titanium dioxide and of zinc sulfide.

2. The thermoplastic polymer composition as defined by claim 1, said combination of inorganic fillers comprising titanium dioxide and zinc sulfide.

3. The thermoplastic polymer composition as defined by claim 1, in which the inorganic fillers are present in binary combinations in proportions by weight ranging from 1:99 to 99:1.

4. The thermoplastic polymer composition as defined by claim 1, in which the thermoplastic polymer comprising the thermoplastic matrix of the polymer composition comprises a polyamide.

5. The thermoplastic polymer composition as defined by claim 1, in which the thermoplastic polymer comprising the thermoplastic matrix of the polymer composition comprises polyamide 6, polyamide 6,6, polyamide 11, polyamide 12, polyamide4, polyamides4,6, 6,10, 6,12, 6,36 and 12,12, and semi-aromatic polyamides prepared from terephthalic and/or isophthalic acid.

6. An article shaped from a thermoplastic polymer composition as defined by claim 1.

7. An article shaped from a thermoplastic polymer as defined by claim 6, in the form of yarns, fibers or filaments.

8. A flocked surface of high mattness comprising one or more shaped articles as defined by claim 6.

9. The thermoplastic polymer composition as defined by claim 1, said proportion by weight being greater than or equal to 2.5%.

10. The thermoplastic polymer composition as defined by claim 3, said proportions by weight ranging from 20:80 to 80:20.

11. The thermoplastic polymer composition as defined by claim 1, said proportions by weight ranging from 40:60 to 60:40.

12. The thermoplastic polymer composition as defined by claim 3, said proportion by weight being on the order of 50:50.

* * * * *